(12) United States Patent
Carlstrom

(10) Patent No.: US 12,009,559 B2
(45) Date of Patent: Jun. 11, 2024

(54) FUEL CELL STACK

(71) Applicant: PLUG POWER INC., Latham, NY (US)

(72) Inventor: Charles Carlstrom, Saratoga Springs, NY (US)

(73) Assignee: PLUG POWER INC., Latham, NY (US)

(*) Notice: Subject to any disclaimer, the term of this patent is extended or adjusted under 35 U.S.C. 154(b) by 0 days.

(21) Appl. No.: 17/335,238

(22) Filed: Jun. 1, 2021

(65) Prior Publication Data
US 2022/0384830 A1   Dec. 1, 2022

(51) Int. Cl.
*H01M 8/1004* (2016.01)
*H01M 8/0286* (2016.01)

(52) U.S. Cl.
CPC ....... *H01M 8/1004* (2013.01); *H01M 8/0286* (2013.01)

(58) Field of Classification Search
CPC ............. H01M 8/1004; H01M 8/0286
See application file for complete search history.

(56) References Cited

U.S. PATENT DOCUMENTS

| | | | |
|---|---|---|---|
| 2009/0286121 A1 | 11/2009 | Morimoto et al. | |
| 2010/0216048 A1 | 8/2010 | Braeuninger et al. | |

FOREIGN PATENT DOCUMENTS

| | | |
|---|---|---|
| EP | 1432060 A1 | 6/2004 |
| EP | 2851986 A1 | 3/2015 |
| JP | 2008034383 A | 2/2008 |
| WO | 9905740 A1 | 2/1999 |

OTHER PUBLICATIONS

International Search Report and Written Opinion, dated Sep. 16, 2022, 9 pp.

*Primary Examiner* — Brian R Ohara
*Assistant Examiner* — Patrick Marshall Greene
(74) *Attorney, Agent, or Firm* — Heslin Rothenberg Farley & Mesiti P.C.; Victor A. Cardona, Esq.

(57) ABSTRACT

A method for use in manufacturing a fuel cell stack includes assembling a membrane electrode assembly to have a membrane between a first gas diffusion layer and a second gas diffusion layer. A bypass blocker is located at a space between a first gas diffusion layer of the membrane electrode assembly and a seal. The blocker is deformed on the seal and deformation is avoided of the blocker at the space such that the blocker inhibits a bypass flow of a reactant through the space between the gas diffusion layer and the seal in a direction of flow of the reactant during operation of the fuel cell. The membrane electrode assembly is located between a first fluid flow plate and a second fluid flow plate.

13 Claims, 7 Drawing Sheets

FUEL CELL STACK

TECHNICAL FIELD

This invention relates in general to electrochemical cells, and more particularly to fuel cells systems and methods.

BACKGROUND OF THE INVENTION

Fuel cells electrochemically convert fuels and oxidants to electricity and heat and can be categorized according to the type of electrolyte (e.g., solid oxide, molten carbonate, alkaline, phosphoric acid or solid polymer) used to accommodate ion transfer during operation. Moreover, fuel cell assemblies can be employed in many (e.g., automotive to aerospace to industrial to residential) environments, for multiple applications.

A Proton Exchange Membrane (hereinafter "PEM") fuel cell converts the chemical energy of fuels such as hydrogen and oxidants such as air directly into electrical energy. The PEM is a sold polymer electrolyte that permits the passage of protons (i.e., H+ ions) from the "anode" side of the fuel cell to the "cathode" side of the fuel cell while preventing passage therethrough of reactant fluids (e.g., hydrogen and air gases). The Membrane Electrode Assembly (hereinafter "MEA") is placed between two electrically conductive plates, each of which has a flow passage to direct the fuel to the anode side and oxidant to the cathode side of the PEM.

An MEA may include a gas diffusion layer (GDL) and a seal surrounding the GDL. A bypass flow of reactants may flow around an active area of the MEA between the GDL and seal in a direction of the flow. Such bypass flow may result in a less efficient system due to a larger needed flow of reactants to make up for the flow going around the active area, i.e., the bypass flow.

Two or more fuel cells can be connected together to increase the overall output of the assembly. Generally, the cells are connected in series, wherein one side of a plate serves as an anode plate for one cell and the other side of the plate is the cathode plate for the adjacent cell. These are commonly referred to as bipolar plates (hereinafter "BPP"). Alternately, the anode plate of one cell is electrically connected to the separate cathode plate of an adjacent cell. Commonly these two plates are connected back to back and are often bonded together (e.g., bonded by adhesive, weld, or polymer). This bonded pair becomes as one, also commonly called a bipolar plate, since anode and cathode plates represent the positive and negative poles, electrically. Such a series of connected multiple fuel cells is referred to as a fuel cell stack or fuel cell system. The stack typically includes means for directing the fuel and the oxidant to the anode and cathode flow field channels, respectively. The stack usually includes a means for directing a coolant fluid to interior channels within the stack to absorb heat generated by the exothermic reaction of hydrogen and oxygen within the fuel cells. The stack generally includes means for exhausting the excess fuel and oxidant gases, as well as product water.

The stack also includes an endplate, insulators, membrane electrode assemblies, gaskets, separator plates, electrical connectors and collector plates, among other components, that are integrated together to form the working stack designed to produce electricity. The different plates may be abutted against each other and connected to each other to facilitate the performance of particular functions.

Thus, a need exists for improved fuel cell systems and improved methods for manufacturing fuel cells that minimize inefficiencies.

SUMMARY OF THE INVENTION

The present invention provides, in a first aspect, a method for use in manufacturing a fuel cell stack which includes assembling a membrane electrode assembly to have a membrane between a first gas diffusion layer and a second gas diffusion layer. A bypass blocker is located at a space between a first gas diffusion layer of the membrane electrode assembly and a seal. The blocker is deformed on the seal and deformation is avoided of the blocker at the space such that the blocker inhibits a bypass flow of a reactant through the space between the seal and the gas diffusion layer. The membrane electrode assembly is located between a first fluid flow plate and a second fluid flow plate.

The present invention provides, in a second aspect, a fuel cell system which includes a membrane electrode assembly having a membrane between a first gas diffusion layer and a second gas diffusion layer. A seal is located around the first gas diffusion layer and a space is located between the first gas diffusion layer and the seal around the gas diffusion layer. A blocker is located at the space between the first gas diffusion layer and the seal such that the blocker inhibits a bypass flow of a reactant through the space from a first side of the first gas diffusion layer to a second side of the first gas diffusion layer in a direction of flow of the reactant during operation of the fuel cell. A first fluid flow plate and a second fluid flow plate are located on opposite sides of the membrane electrode assembly.

BRIEF DESCRIPTION OF THE DRAWINGS

The subject matter which is regarded as the invention is particularly pointed out and distinctly claimed in the claims at the conclusion of the specification. The foregoing and other features and advantages of the invention will be readily understood from the following detailed description of the preferred embodiments taken in conjunction with the accompanying drawings in which:

DETAILED DESCRIPTION

In accordance with the principles of the present invention, fuel cell systems and methods are provided.

Figure 1:
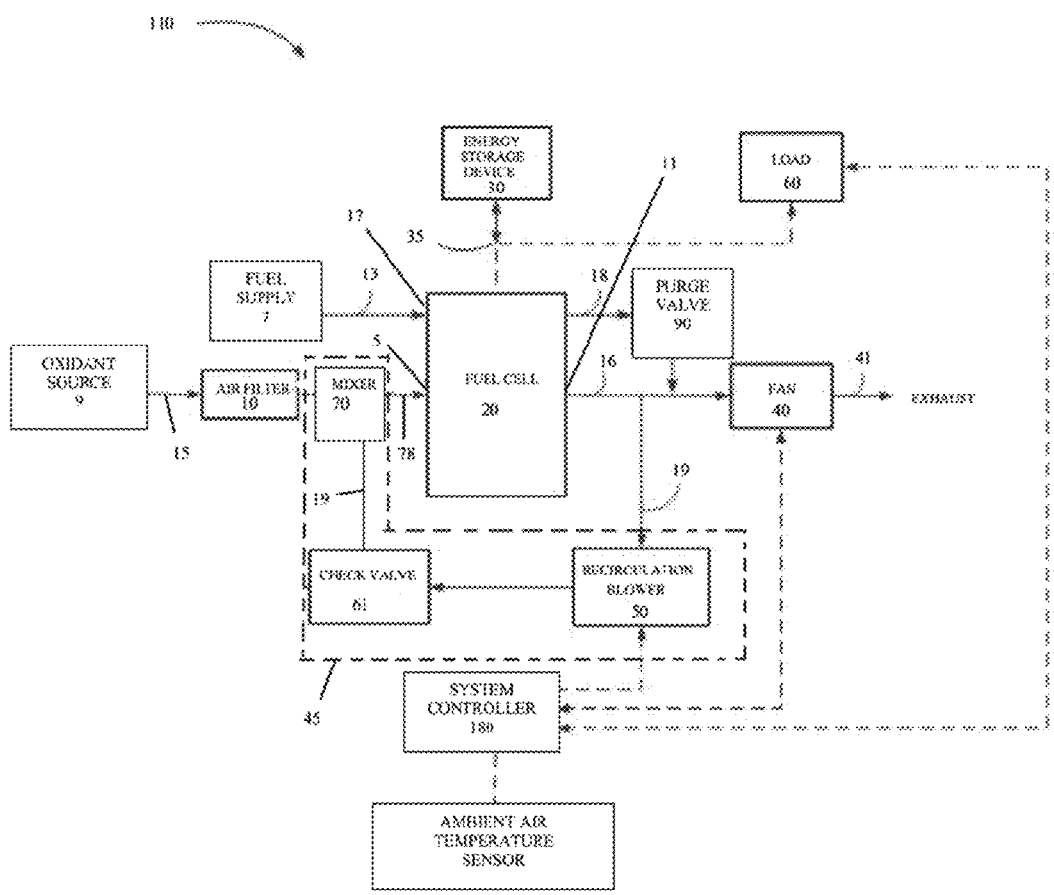
FIG. 1 is a block diagram of a fuel cell system in accordance with the invention.

In an example depicted in FIG. 1, a fuel cell system 10 is referred to as the assembled, or complete, system which functionally together with all parts thereof produces electricity and typically includes a fuel cell stack 20 and an energy storage device (30). The fuel cell is supplied with a fuel 13, for example, hydrogen, through a fuel inlet 17. Excess fuel 18 is exhausted from the fuel cell through a purge valve 90 and may be diluted by a fan 40. In one example, fuel cell stack 20 may have an open cathode architecture of a PEM fuel cell, and combined oxidant and coolant, for example, air, may enter through an inlet air filter 10 coupled to an inlet 5 of fuel cell 20. Excess coolant/oxidant and heat may be exhausted from a fuel cell cathode of fuel cell stack 20 through an outlet 11 to fan 40 which may exhaust the coolant/oxidant and/or excess fuel to a waste exhaust 41, such as the ambient atmosphere. The fuel and coolant/oxidant may be supplied by a fuel supply 7 and an oxidant source 9 (e.g., air), respectively, and other components of a balance of plant, which may include compressors, pumps, valves, fans, electrical connections and sensors.

Figure 2:
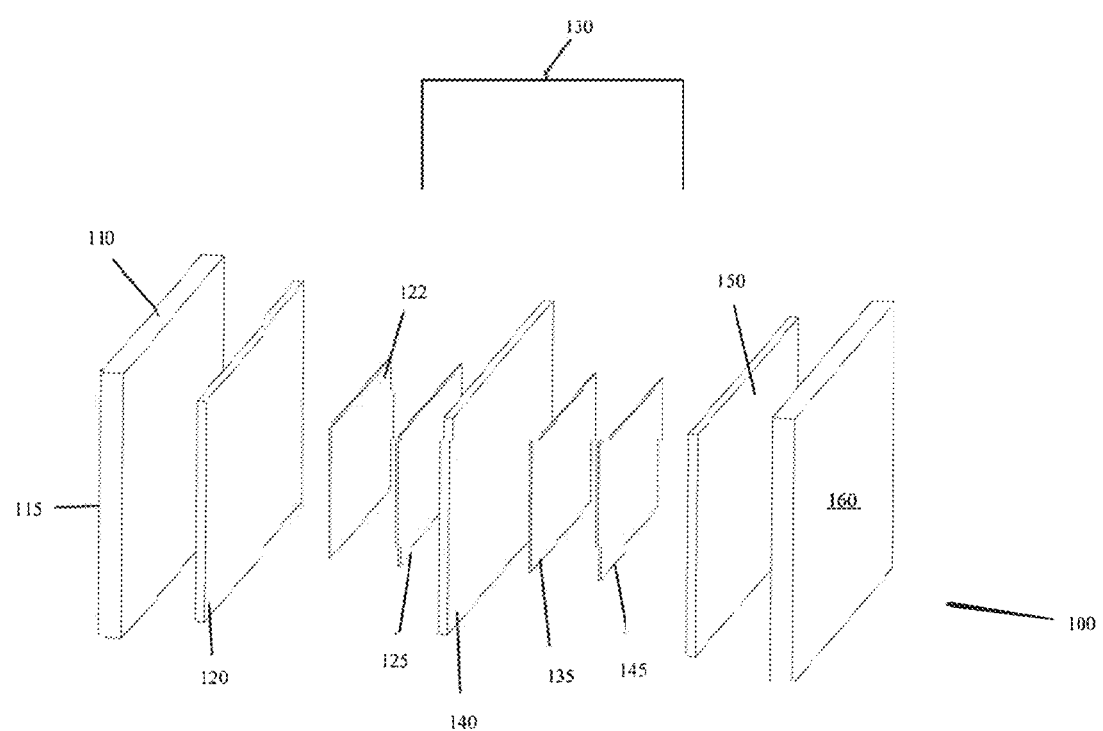
FIG. 2 is an exploded perspective view of a portion of a fuel cell of the fuel cell system of FIG. 1.

FIG. 2 depicts an internal subassembly 100 of fuel cell stack 20 of FIG. 1 including a cathodic end fluid flow plate 110 at an outer end 115 and a flow plate seal 120 on an inner side thereof. A membrane electrode assembly (MEA) 130 is located between seal 120 and a second flow plate seal 150. An anode flow plate 160 is on a second end 165 of subassembly 100.

MEA 130 includes a membrane 140 between a cathode side catalyst layer 125 and an anode side catalyst layer 135. A cathode side gas diffusion layer (GDL) 122 is located between cathode side catalyst layer 125 and flow plate 110. An anode side gas diffusion layer 148 is located between anode side catalyst layer 135 and flow plate 160. Seal 120 and seal 150 may be received in a channel of an inner side of flow plate 110 and flow plate 160, respectively.

Figure 3:
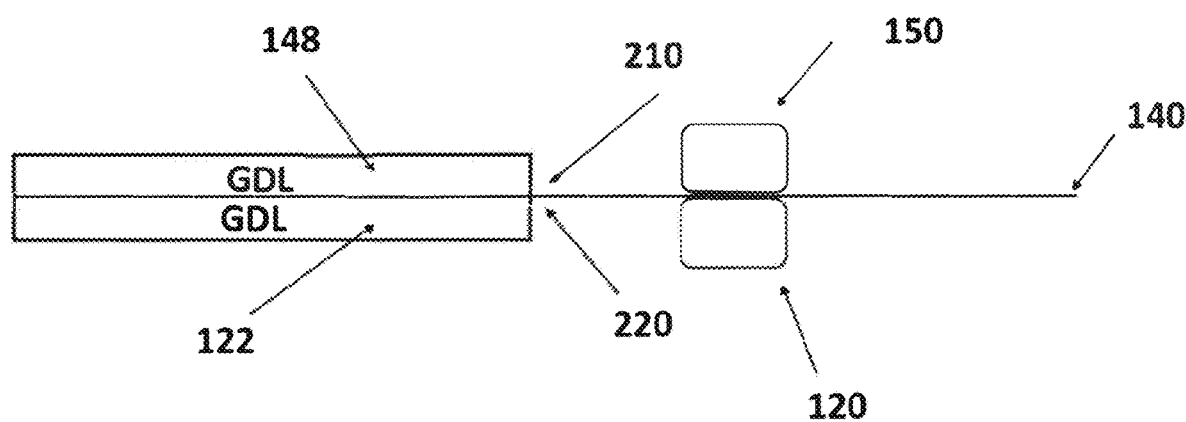
FIG. 3 is a side view of a portion of a fuel cell of the fuel cell system of FIG. 1 during an assembly process.

FIG. 3 depicts a side cross sectional view of a portion of subassembly 100 including a peripheral space 210 between outside surfaces of GDL 148 and inside surfaces of seal 150 and a second peripheral space between GDL 122 and seal 120. Such spaces may be formed due to imprecision in the dimensions of the GDL's and seals when they are manufactured. The seals are shown exploded relative to MEA 140 for ease of illustration and would have a smaller relative width normal to a longitudinal direction thereof. The seals are shown in an uncompressed state.

Figure 4:
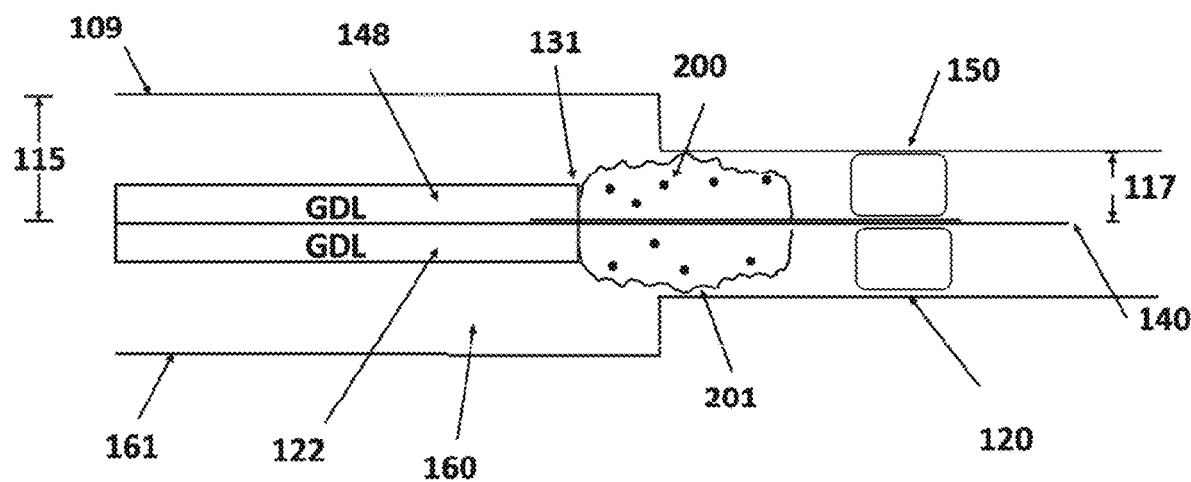
FIG. 4 is a side view of a portion of a fuel cell of the fuel cell system of FIG. 1 during an assembly process showing a blocker covering a space between a seal and a gas diffusion layer.

FIG. 4 depicts a side cross sectional view of a portion of subassembly 100 including a first reactant fluid bypass blocker 200 and a second reactant fluid blocker 201 on opposite sides of membrane 140 on a peripheral edge 131 of MEA 130 with first blocker 200 and second blocker 201 being in an undeformed or uncompressed state. The flow plates may have inside surfaces of different dimensions in a normal direction relative to a longitudinal dimension thereof. For example, in the uncompressed state with the flow plates not yet engaged, an inside surface 109 of flow plate 110 may have a first distance 115 from membrane 140 and a second closer distance 117 from membrane 140. Similarly, an inside surface 161 of flow plate 160 may have inside surfaces with different distances from membrane 140.

Figure 5:
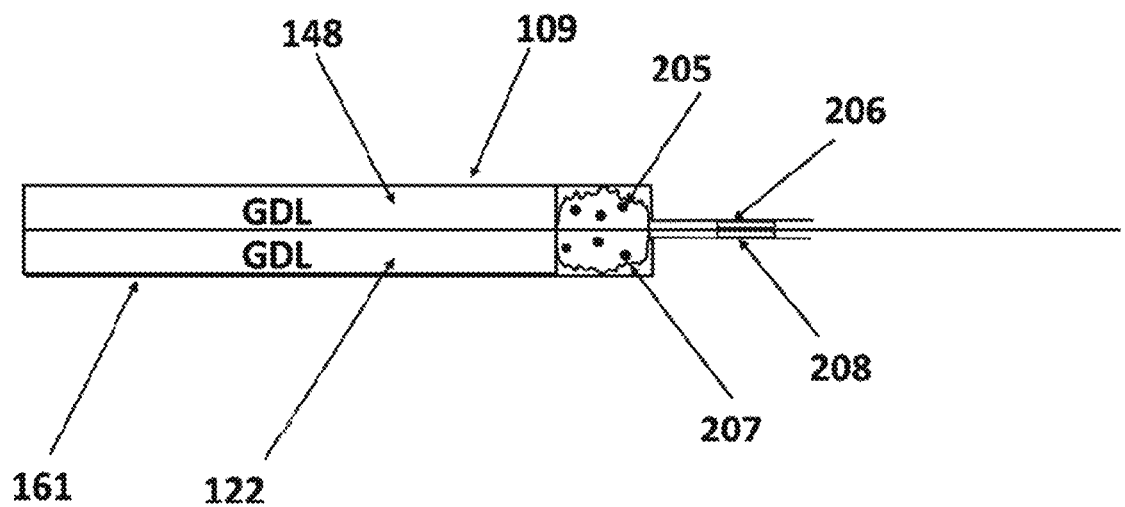
FIG. 5 is a side view of a portion of a fuel cell of the fuel cell system of FIG. 1 during an assembly process showing a blocker covering a space between a seal and a gas diffusion layer after a compression of the blocker.

FIG. 5 depicts subassembly 100 as depicted in FIG. 4 after a force has been applied to flow plate 160 and/or flow plate 110 which applies force to blocker 200 and blocker 201. The force may be applied in a direction substantially or approximately perpendicular to a longitudinal dimension of subassembly 100 and may compress the blockers (i.e., first blocker 200 and second blocker 201) except for a portion of the blockers located at (e.g., above and/or below) a space (e.g., space 210 and/or space 220) between a GDL (e.g., GDL 148 and/or GDL 122) and a seal (seal 150 and/or seal 120). For example, the seals may be gaskets which peripherally surround MEA 130 and have inside surfaces bounding a cavity receiving MEA 130. In another example, such a force may be applied directly to blocker 200, or blocker 200 and MEA 130, for example, during a manufacturing process.

A portion of each of the blockers may be compressed, and a portion of each of the blockers may remain uncompressed after an application of force to the blockers directly or via the flow plates receiving such a force. For example, as depicted in FIG. 5, a first longitudinal portion 205 of blocker 200 and a second longitudinal portion 207 of blocker 201 may remain uncompressed and may inhibit of flow of reactants through space 210 and space 220 during operation of the fuel cell. A third longitudinal portion 206 of blocker 200 and a fourth longitudinal portion 208 of blocker 201 may be compressed by the forces described above. For example, the compressed portions (e.g., third portion 206 and fourth portion 208) may remain compressed due to forces holding these portions compressed after an initial compression (e.g., for an elastically deformable blocker) or these portions may remain compressed due to plastic deformation thereof.

The forces may be applied directly to the blockers such that portions thereof (e.g., first longitudinal portion 205 and second longitudinal portion 207) at the locations of the spaces (e.g., space 210 and space 220) remain uncompressed or the inside surfaces (e.g., inside surface 109 and inside surface 161) of the flow plates may be configured (e.g., shaped and dimensioned) such that when the forces are applied thereto such inside surfaces do not apply force to the blockers in the longitudinal locations (i.e., relative to the longitudinal dimension of the assembly) of the spaces (e.g., space 210 and space 220) such that first longitudinal portion 205 and second longitudinal portion 207 are not compressed.

The blockers (e.g., blocker 200 and blocker 201) may remain outside the spaces (e.g., space 210 and space 220) in a direction of a flow of reactants, or may extend into the spaces, while inhibiting or preventing reactants from flowing into the spaces. Uncompressed areas (e.g., first longitudinal portion 205 and second longitudinal portion 207) of the blockers may have a same thickness (in a direction approximately perpendicular to a longitudinal dimension of subassembly 100) as a longitudinally adjacent GDL and may inhibit a flow of reactants in a direction of flow from a first side of a GDL to an opposite side thereof around an active area of the MEA.

A blocker (e.g., blocker 200 or a blocker 201) could be nonporous and formed of an elastically deformable material, such as a foam (e.g., open cell ethylene propylene diene monomer (EPDM) or open cell silicone foam), or a plastically deformable material, such as a clay material or an elastomer not yet cured such as RTV elastomers. For example, blocker 200 may be formed of such an elastically deformable foam material and may extend longitudinally over and cover space 210 and extend past the space over a portion of a seal (e.g., seal 150). As described above a portion (e.g., first longitudinal portion 205) of the blocker at the location of a space (e.g., space 210) may remain uncompressed and a portion (e.g., third longitudinal portion 206) contacting the seal may be compressed in response to a force being applied. The compressed portion (e.g., longitudinal portion 206) may remain compressed while a force continues to hold it in compression and may be formed of a material such that it is easily compressed (e.g., a force less than 1lb per linear inch), and it has a minimum or negligible thickness (e.g., less than 0.003 in.) in a direction normal to a longitudinal dimension of subassembly 100. In an example, blockers (e.g., blocker 200 and blocker 201) may be applied in a bead that is either not yet cured (e.g., RTV elastomer) or easily compressible (e.g., foams) and then a fuel cell stack (e.g., system 10) may be built. When the stack components are compressed during the assembly process, the elastomer (e.g., RTV) and foam may be compressed and take up voids left in the areas to which it is applied. In other words, the bypass blockers may not impact the original components (e.g., MEA 130) because the blockers compress so relatively easily (e.g., requiring less than 1lb/linear inch for such compression) that such blockers fill voids that would normally occur in the assembly, i.e., absent the blockers. MEA 130 described above may be formed in a process including lamination of several sheet components (e.g., membrane 140, catalyst 125, catalyst 135) that are compressed or bonded with heat and/or adhesive. The blockers may be laminated and compressed during this process or as an extra step at the end of the MEA assembly process.

A blocker (e.g., blocker 200 or a blocker 201) could also be formed of a plastically deformable material which is deformed similarly to an elastically deformable version, but which would remain deformed when an applied force is released. Seal 120 and seal 150 may be formed of a material different from the blocker(s) (e.g., blocker 200 and/or blocker 201). Alternatively, the seals and blockers could be formed separately but formed of a same material. For example, a blocker (e.g., blocker 200 or a blocker 201) may be formed of a foam (e.g., open cell ethylene propylene diene monomer (EPDM) or open cell silicone) in an elastically deformable version, of a room temperature vulcanizing material in a plastically deformable version, or a blocker could be formed of a clay. The blockers may be easily compressible (e.g., less than 1 lb/per linear inch, such that high pressure is not needed during the compression process and such forces would not deform or distort the fuel cell flow plates.

In an example, the seals (e.g., seal 150 and seal 120) may be formed of an elastomer applied by a robotic dispensing machine by machine (e.g., a PVA brand device). Such an elastomer may be difficult or impossible to remove from a fluid flow plate after it is applied such that re-use of such a flow plate at the end of life of such a seal, or if the fuel cell is decommissioned for other reasons, may be difficult. The seals may also be formed fluoropolymer elastomer or other types of room temperature vulcanizing (RTV) compounds. A machine may be utilized to apply a blocker formed of a fluoropolymer elastomer. As described above relative to the seals, it may be difficult or impossible to remove such a blocker formed of these materials from a fluid flow plate or MEA such that components having these materials applied thereto may need to be discarded and not re-used in rebuilds (e.g., when fuel cell stacks are disassembled, cleaned, used parts replaced, and rebuilt using reusable components such as the fluid flow plates).

In another example, a blocker may be formed of metal portions of a flow plate which extend from edges of a standard flow plate, such as those described above, and are deformable in response to a force normal to a longitudinal dimension of the flow plates, for example, to extend over and inhibit reactant flow into the spaces (e.g., space 210 and space 220) described above. Such deformation of blockers extending from a flow plate may be plastically deformed. As described above, the blockers (e.g., blocker 200 and blocker 201) may be placed in particular desired locations, compressed and laminated or otherwise held in place during assembly of an MEA and fuel cell stack. Such plastically deformed blockers would need to be replaced during a fuel cell rebuild. When it is desired to rebuild a fuel cell having blockers formed of foam, such foam blockers may be retrieved and reused in a rebuilt fuel cell or new foam blockers may be utilized.

Figure 6:
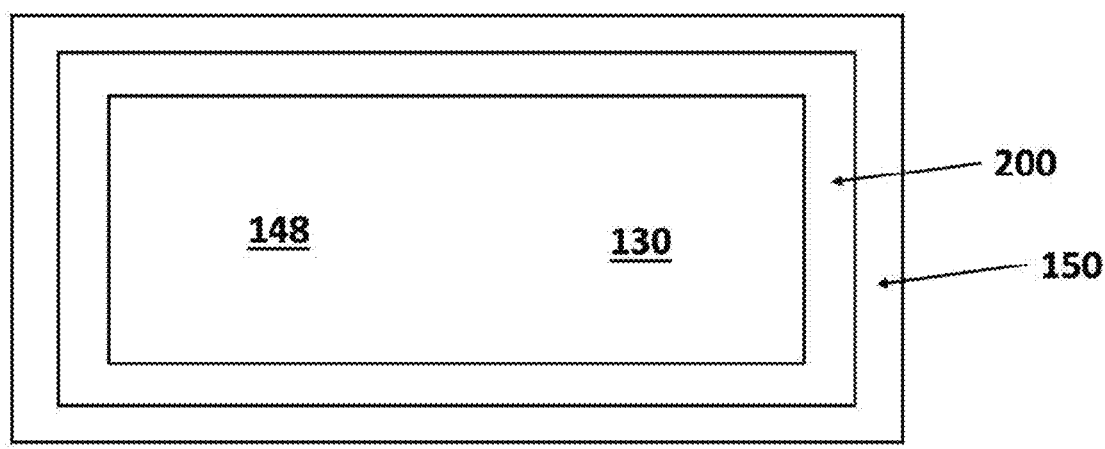
FIG. 6 is an end view of a portion of a fuel cell of the fuel cell system of FIG. 5 during an assembly process showing the blocker covering the space between the seal and the gas diffusion layer.
Figure 7:
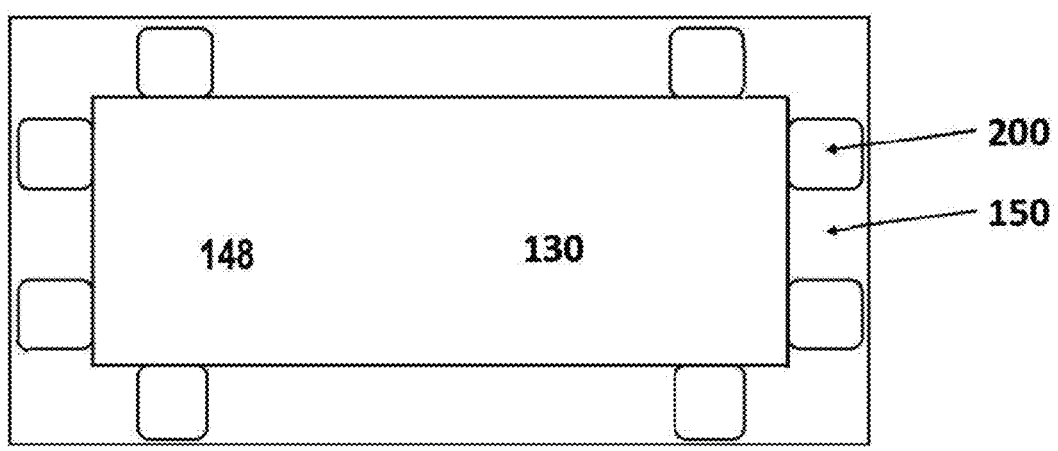
FIG. 7 is an end view of another example of a portion of a fuel cell of the fuel cell system of FIG. 1 during an assembly process showing a plurality of blockers covering a plurality of spaces between a seal and a gas diffusion layer.

The blockers (e.g., blocker 200 and blocker 201) described above are omitted from FIG. 2 for clarity and in a complete subassembly would be located continuously around a GDL (e.g., GDL 148 or GDL 122) as depicted in FIG. 6 or at particular discrete portions as depicted in FIG. 7, for example. FIG. 6 is an end view of subassembly 100 including GDL 148 surrounded by blocker 200 which is surrounded by seal 150. In another example depicted in FIG. 7, a plurality of blockers (e.g., multiple instances of blocker 200) may be located at various discrete locations around GDL 148, but does not continuously surround the GDL. Such an arrangement may be used when there are spaces between a GDL and seal, similar to space 210 and space 220 described above, but which are located in various locations around the GDL and are not continuously surrounding the GDL.

As described above, subassembly 100 may include GDL's (e.g., GDL 122 and GDL 148) located adjacent seals (e.g., seal 120 or seal 150). Spaces (e.g., space 210, space 220) may be present in peripheral areas during an assembly of these components due to imprecisions in manufacturing these components. The use of blockers (e.g., blocker 200 and blocker 201) allow tolerances in dimensions when forming the GDL's and seals to be less severe since the blockers may be used to inhibit flow of reactants through such spaces thereby inhibiting a bypass flow of reactants which would make a fuel cell less efficient.

The load described above could be any type of stationary or moveable load device, such as an industrial electrical vehicle or forklift truck. The fuel cell (e.g., fuel cell system 20) could be any type of fuel cell such as a proton exchange membrane fuel cell, solid oxide fuel cell, or any other fuel cell as would be known by one of ordinary skill in the art. The energy storage device described above could be any type of battery or other way of storing energy such as a lithium ion battery, lead acid battery, air compression energy storage device, water storage device, capacitor, ultra-capacitor, or any other device for storing energy.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprise" (and any form of comprise, such as "comprises" and "comprising"), "have" (and any form of have, such as "has" and "having"), "include" (and any form of include, such as "includes" and "including"), and "contain" (and any form contain, such as "contains" and "containing") are open-ended linking verbs. As a result, a method or device that "comprises", "has", "includes" or "contains" one or more steps or elements possesses those one or more steps or elements, but is not limited to possessing only those one or more steps or elements. Likewise, a step of a method or an element of a device that "comprises", "has", "includes" or "contains" one or more features possesses those one or more features, but is not limited to possessing only those one or more features. Furthermore, a device or structure that is configured in a certain way is configured in at least that way, but may also be configured in ways that are not listed.

For the purposes of promoting an understanding of the principles of the invention, reference will now be made to embodiments of the invention and specific language will be used to describe the same. It will nevertheless be understood that no limitation of the scope of the invention is thereby intended, and any alterations and further modifications in the described embodiments, and any further applications of the principles of the invention as illustrated therein as would normally occur to one skilled in the art to which the invention relates are contemplated and protected.

Although preferred embodiments have been depicted and described in detail herein, it will be apparent to those skilled in the relevant art that various modifications, additions, substitutions and the like can be made without departing from the spirit of the invention and these are therefore considered to be within the scope of the invention as defined in the following claims.

What is claimed is:

1. A method for use in manufacturing a fuel cell stack:
    assembling a membrane electrode assembly to have a membrane between a first gas diffusion layer and a second gas diffusion layer;
    locating the membrane electrode assembly between a first fluid flow plate and a second fluid flow plate;
    locating a bypass blocker at a space between the first gas diffusion layer of the membrane electrode assembly and a seal,
    the space bounded vertically from a longitudinal axis of the membrane electrode assembly by a first fluid flow plate, the first fluid flow plate having a first height extending normal relative to the longitudinal axis defining a first surface and a second height extending normal relative to the longitudinal axis defining a second surface,
    wherein the first height of the first surface and the second height of the second surface are different and the first height extends further normal relative to the longitudinal axis than the second height; and
    deforming the blocker at the space within the length of the second surface and avoiding deforming the blocker at the space within the length of the first surface such that a first portion of the blocker at the space within the length of the first surface and a second portion of the blocker at the space within the length of the second surface have different heights such that the blocker inhibits a bypass flow of a reactant through the space from a first side of the first gas diffusion layer to a second side of the first gas diffusion layer in a direction of flow of the reactant during operation of the fuel cell.

2. The method of claim 1 wherein the space and the blocker are located peripherally outside the gas diffusion layer and peripherally inside the seal.

3. The method of claim 1 wherein the deforming the blocker comprises compressing the blocker by applying a force to the blocker by applying a force to the first flow plate in contact with the blocker in a direction about normal to a longitudinal dimension of the membrane electrode assembly.

4. The method of claim 1 wherein the blocker has a width dimension in a direction normal to a longitudinal dimension of the membrane electrode assembly about equal to a width dimension of the Gas diffusion layer in the direction normal to a longitudinal dimension of the membrane electrode assembly.

5. The method of claim 1 wherein the blocker comprises a first blocker and further comprising a second blocker located at a second space peripherally outside a second gas diffusion layer and peripherally inside a second seal on an opposite side of the membrane relative to the seal and the gas diffusion layer.

6. The method of claim 1 wherein the deforming the blocker comprises compressing the blocker by applying a force to the blocker in a direction about normal to a longitudinal dimension of the membrane electrode assembly to elastically deform the blocker.

7. The method of claim 1 wherein the deforming the blocker comprises compressing the blocker by applying a force to the blocker in a direction about normal to a longitudinal dimension of the membrane electrode assembly to plastically deform the blocker.

8. The method of claim 1 wherein the blocker is nonporous and elastically deformable.

9. The method of claim 1 further comprising laminating the membrane electrode assembly, the blocker and the seal to maintain the blocker on the seal.

10. The method of claim 1 wherein the locating the membrane electrode assembly between a first fluid flow plate and a second fluid flow plate comprises inside surfaces of the fluid flow plates being configured to maintain the blocker at the space undeformed and the blocker on the seal deformed.

11. The method of claim 1, wherein the blocker can be compressed at a force less than 1 lb per linear inch.

12. The method of claim 1, further comprising:
    locating a second bypass blocker at a second space between the second gas diffusion layer of the membrane electrode assembly and a second seal,
        the second space bounded vertically by a second fluid flow plate, the second fluid flow plate having a third height extending normal relative to the longitudinal axis defining a third surface and a fourth height extending normal relative to the longitudinal axis defining a fourth surface,
        wherein the third height of the third surface and the fourth height of the fourth surface are different and the third height extends further normal relative to the longitudinal axis than the fourth height; and
    deforming the second blocker at the space within the length of the third surface and avoiding deforming the second blocker at the space within the length of the fourth surface such that a first portion of the second blocker at the space within the length of the third surface and a second portion of the second blocker at the space within the length of the fourth surface have different heights such that the second blocker inhibits a bypass flow of a reactant through the space from a first side of the second gas diffusion layer to a second side of the second gas diffusion layer in a direction of flow of the reactant during operation of the fuel cell.

13. The method of claim 1, wherein the first surface and the second surface extend parallel to each other.

* * * * *